Oct. 1, 1935.                A. D. ROBBINS                2,015,729
                    ACTUATING MEANS FOR FRICTION DISKS
                         Filed July 14, 1928.        3 Sheets-Sheet 1

Oct. 1, 1935.  A. D. ROBBINS  2,015,729
ACTUATING MEANS FOR FRICTION DISKS
Filed July 14, 1928   3 Sheets-Sheet 2

INVENTOR
Azor D. Robbins
BY Chas. M. C. Chapman
ATTORNEY

Oct. 1, 1935.  A. D. ROBBINS  2,015,729
ACTUATING MEANS FOR FRICTION DISKS
Filed July 14, 1928  3 Sheets-Sheet 3
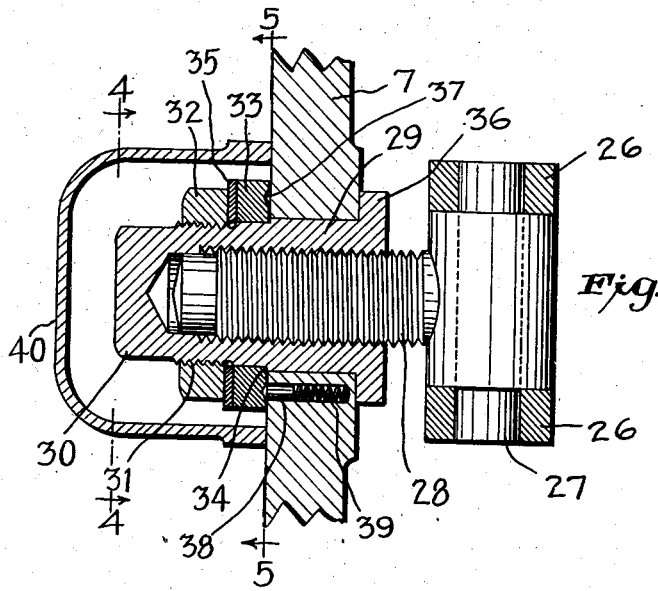
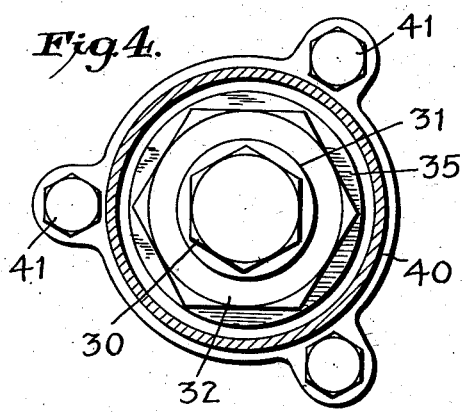
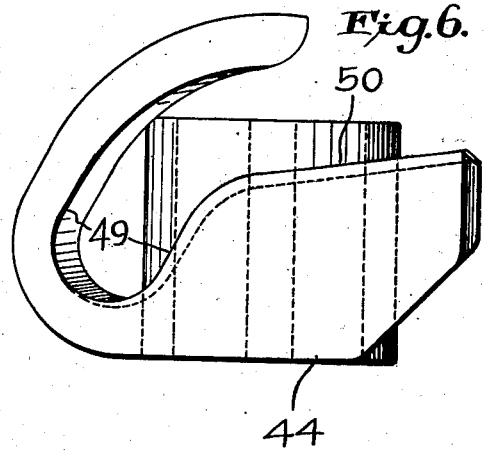
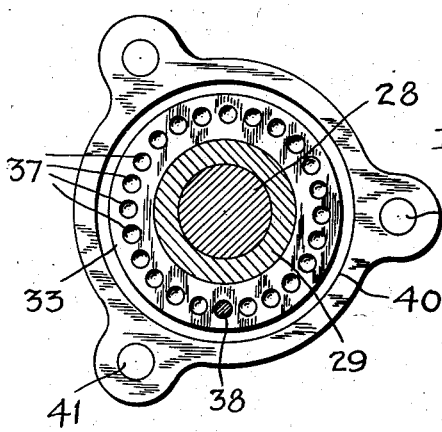
INVENTOR
Azor D. Robbins
BY Chas. M. C. Chapman
ATTORNEY Patented Oct. 1, 1935

2,015,729

UNITED STATES PATENT OFFICE 2,015,729

ACTUATING MEANS FOR FRICTION DISKS

Azor D. Robbins, New York, N. Y., assignor, by mesne assignments, to Bendix Aviation Corporation, South Bend, Ind., a corporation of Delaware Application July 14, 1928, Serial No. 292,728

8 Claims. (Cl. 188—72)

This invention relates to the art of motor vehicles and particularly has reference to a friction brake mechanism specially adapted for trucks and other heavy vehicles.

This invention is specially applied to the friction brake mechanism, and more particularly disk brakes, and includes means for forcing the friction disks together, for braking purposes, with a positive, gradually increasing and powerful pressure.

Among the objects of my invention may be noted the following: To provide a special form of cam, or operating device, by which brake disks can be forced together quickly and with ease and, when brought together, the pressure thereon can be gradually and powerfully applied for braking purposes; to provide a pressure applying means for friction brakes which is easily started into action, is positive in application of pressure, and by which a great pressure can be built up; to provide a lever mechanism by which, through the medium of a pressure pad, a friction brake can be operated uniformly and with accumulation of power and pressure; to provide an adjustable fulcrum for the lever so as to enable it to support the lever in a constant and fixed relation to the brake disks and thus compensate for wear of said brake disks and thus compensate for wear of said disks from constant use, said fulcrum being easily accessible and readily manipulated for the purpose; to provide a brake-lever operating means which requires no great effort to start it into action and which will continue the operation of the lever to apply the brake with the expenditure of a minimum of effort resulting in the application of a maximum of pressure; and to provide a brake operating mechanism for the purposes stated in the foregoing which is economical to produce, easy of application, effective in operation, strong, durable, accessible and easily adjusted to maintain efficiency.

With the above object in view and others which will be detailed during the course of this description, my invention consists in the parts, features, elements and combinations thereof hereinafter described and claimed.

In order that my invention may be readily understood, I have provided drawings wherein:

Figure 3 is a sectional view, on a larger scale, of the adjustable fulcrum, the view being taken on line 3—3 of Figure 1;

Figure 1:
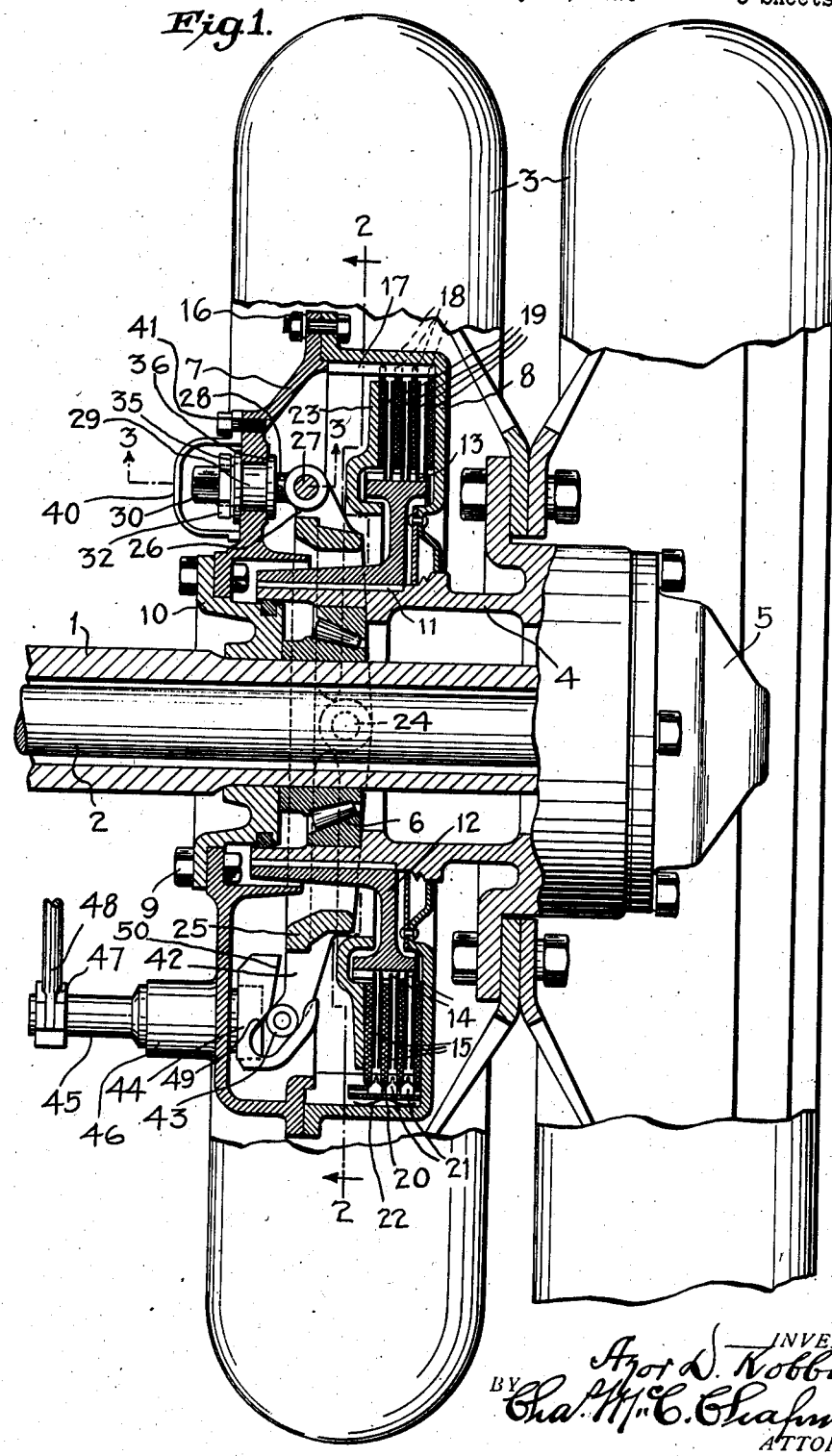
Figure 1 is a longitudinal sectional view of a brake mechanism with parts in elevation, embodying my invention.

Figures 4 and 5 are cross-sectional views taken, respectively, on lines 4—4 and 5—5 of Figure 3; and Figure 6 is an enlarged view in elevation of the cam for operating the lever.

Referring to the drawings, the numeral 1 indicates a fixed casing or housing for the driven shaft 2. Wheels 3, having suitable webs or flanges, are bolted or otherwise secured together and to a hub 4, the hub being splined or secured to the outer end of the driven shaft 2, through the medium of hub-cap 5. Suitable roller bearings 6 are provided between the hub 4 and the stationary casing 1. A fixed housing 7 having a cover 8 is bolted at 9 to a member 10 suitably secured to the casing 1.

Splined at 11 to the hub 4 is a flanged member 12 having teeth 13 on its circumference. These teeth 13 engage similar teeth 14 on disks 15, which are preferably formed of two plates spaced apart to allow for the circulation of a lubricant and cooling fluid to prevent overheating.

The cover 8 of the stationary housing is bolted at 16 to the body portion and is provided with internal teeth 17 which engage teeth 18 on disks 19, which are preferably formed of a friction material such as leather or some suitable friction material.

Means indicated at 20 are provided for causing the disks to separate when the brake is released. This means is described and claimed in Patent No. 1,933,176, issued October 31, 1933, and comprises a series of wedge pieces 21 supported in carriers which are mounted in grooves in the cover of the stationary housing, the carriers and wedge pieces being forced inward to separate the disks by springs 22.

An annular pressure plate 23 is arranged adjacent the outer disk 19 and surrounds the hub 4, and is adapted to crowd said disks and brake disks 15 together and against the cover 8 for braking purposes, said plate being pivoted at diametrically opposite points 24 to a lever 25 forming part of my present invention, which is also annular and surrounds the hub 4 and its associated parts.

This annular lever 25 is provided with ears 26 which are pivoted at 27 to an adjustable stud 28 mounted in the body portion 7 of the stationary housing. This adjustable pivot is particularly illustrated in Figures 3, 4 and 5. The stud 28 has threaded engagement with a sleeve 29. The outer end 30 of this sleeve is angular for application of a wrench, and adjacent the angular part it is externally threaded at 31. A nut 32 engages these threads and forces a ring-like member 33 against a shoulder 34 on the sleeve 29. A lock washer 35 is interposed between the member 33 and the nut 32. The inner end of the sleeve 29 has a flange 36 which engages a finished surface or pad on the inner side of the housing 7. From the foregoing it will be apparent that as the sleeve is rotated the stud 28, being held against rotation, will move in or out depending upon which direction the sleeve is turned, and the pivot 27 will likewise be caused to move in or out.

Means are provided for holding the sleeve 29 stationary after the desired adjustment has been made. The side of the member 33 adjacent the housing 7 is provided with a plurality of depressions 37. Mounted in the stationary housing 7 is a plunger 38 behind which is a spring 39 which tends to force the end of the plunger into engagement with one of the depressions 37. Application of a wrench to the angular end 30 of the sleeve will allow the plunger 38 to click past the depressions 37 until the desired adjustment is reached. The spring 39 is sufficiently strong to maintain the plunger in engagement with any one of the depressions despite the jar and vibration that would occur in operation.

Figure 2:
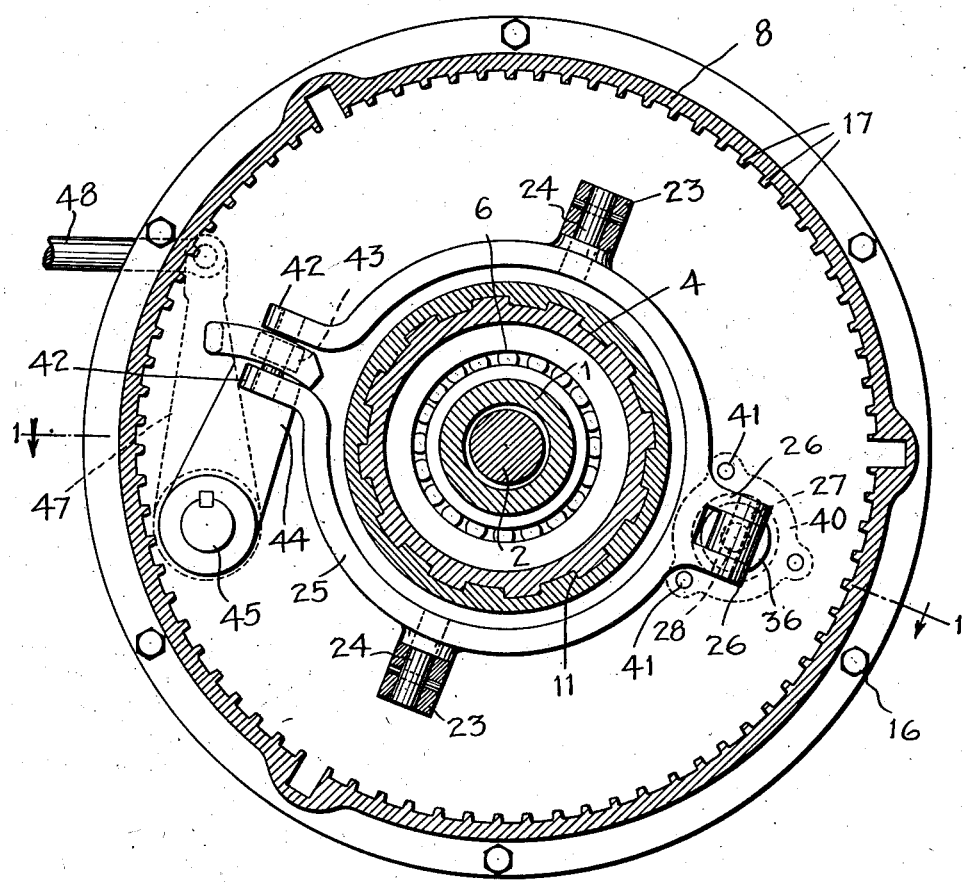
Figure 2 is a cross-sectional view taken on the line 2—2 of Figure 1, looking in the direction of the arrows.

A cover 40 is secured by bolts 41 over the exposed end of the sleeve 29. When it is desired to make an adjustment, the cover 40 is removed and a wrench is applied to the angular portion 30 of the sleeve 29. In this way this important adjustment may be made without disturbing any of the operating parts of the brake structure. On the side of the lever 25, opposite the fulcrum, ears 42 are provided and said ears carry a roller 43. This roller 43 engages a cam groove in the member 44, said member being shown in Figures 1 and 2 and in detail in Figure 6. The cam member 44 is mounted on an oscillating shaft 45 having a bearing 46 in the housing 7. Secured to the shaft 45 outside of the stationary housing is an arm 47 which has pivoted to it the rod 48 leading to the pedal or brake operating means. As the shaft 45 is oscillated, the cam member will act through the medium of the lever 25, and pressure plate 23, to force the friction disks together or allow them to be separated.

When the brake is not in operation, the disks are separated. It is very desirable, for an efficient operation of the brake, to have the first movement of the brake operating means instantly bring all the disks together and a continued movement of the brake operating means apply slow but great pressure in forcing the disks together, so as to procure the maximum and most efficient braking effect. For this purpose the cam groove in the member 44 is made with two angles, a steep "quick" angle 49 which instantly closes the brake disks when pressure is applied to the brake operating means, and a lesser "slow" angle 50 which allows a high pressure to be exerted with a continued operation of the brake.

Numerous modifications of my mechanism might be devised, by one skilled in the art, for either adjusting the fulcrum of the lever, or shifting the disks first rapidly and then slowly but powerfully, without departing from the scope and spirit of my invention; for, broadly, such fulcrum adjusting means and disk operating means are important features of my invention upon which I desire to lay stress, their functions and structural features being of the essence of my invention as set forth in the claims hereof.

Having thus described my invention, what I claim and desire to secure by Letters Patent is:

1. In combination with a brake mechanism for motor vehicles, means for applying power to the brake parts including a lever of the first order, a lever of the second order pivotally supporting said first named lever, a cam for actuating the supporting lever and an adjustable support for said supporting lever.

2. In combination with a rotary disc, a brake disk and an operating element pivotally supporting said brake disk centrally to shift the brake disk into and out of engagement with the rotary disk, a pair of externally and internally threaded members adapted for relative rotary and longitudinal movement for moving one end of said operating element, one of said members being fixed against rotation, and one of said members being fixed against axial movement and actuating means acting on the other end of said lever.

3. In combination with a brake mechanism for motor vehicles, means for applying power to the brake parts including a pressure member, a lever pivotally supporting said member centrally, a pair of threaded members for actuating said lever at one end thereof and an actuating means acting on the other end of said lever.

4. In a brake mechanism a primary disk, a secondary disk, and means to tiltably and non-rotatably support and move the primary disk into frictional contact with the secondary disk comprising a fulcrumed element upon which the primary disk is tiltably mounted means to adjust the fulcrum of said element, and a cam mechanism engaging said fulcrumed element to move the same.

5. In combination with a brake mechanism for motor vehicles, the parts of which surround the axle carrying the brake, means for applying power to the said parts, including a pressure plate, a lever pivotally mounted on the plate and acting upon said plate, both of which encircle said axle, adjustable supporting means for one end of said lever and actuating means for the other end of said lever.

6. In combination with a brake mechanism for motor vehicle, the parts of which surround the axle and carry the brake, means for applying power to the said parts, including a circular pressure plate surrounding said axle, a lever also surrounding said axle and pivoted to the plate for acting upon the plate, a cam for actuating said lever, and an adjustable support for said lever having screw threaded members.

7. In combination with a brake mechanism for motor vehicles, means for applying power to the brake parts including a pressure member, a lever pivotally supporting said member centrally, a cam for actuating said lever at one end thereof, and an adjustable support for the other end of said lever.

8. In combination with a brake mechanism for a motor vehicle, means for applying power to the brake parts including a lever, a circular plate mounted thereon, an oscillatory cam, means for rocking said cam rigidly connected to the latter, and an adjustable support for said lever.

AZOR D. ROBBINS.